Figure 1:
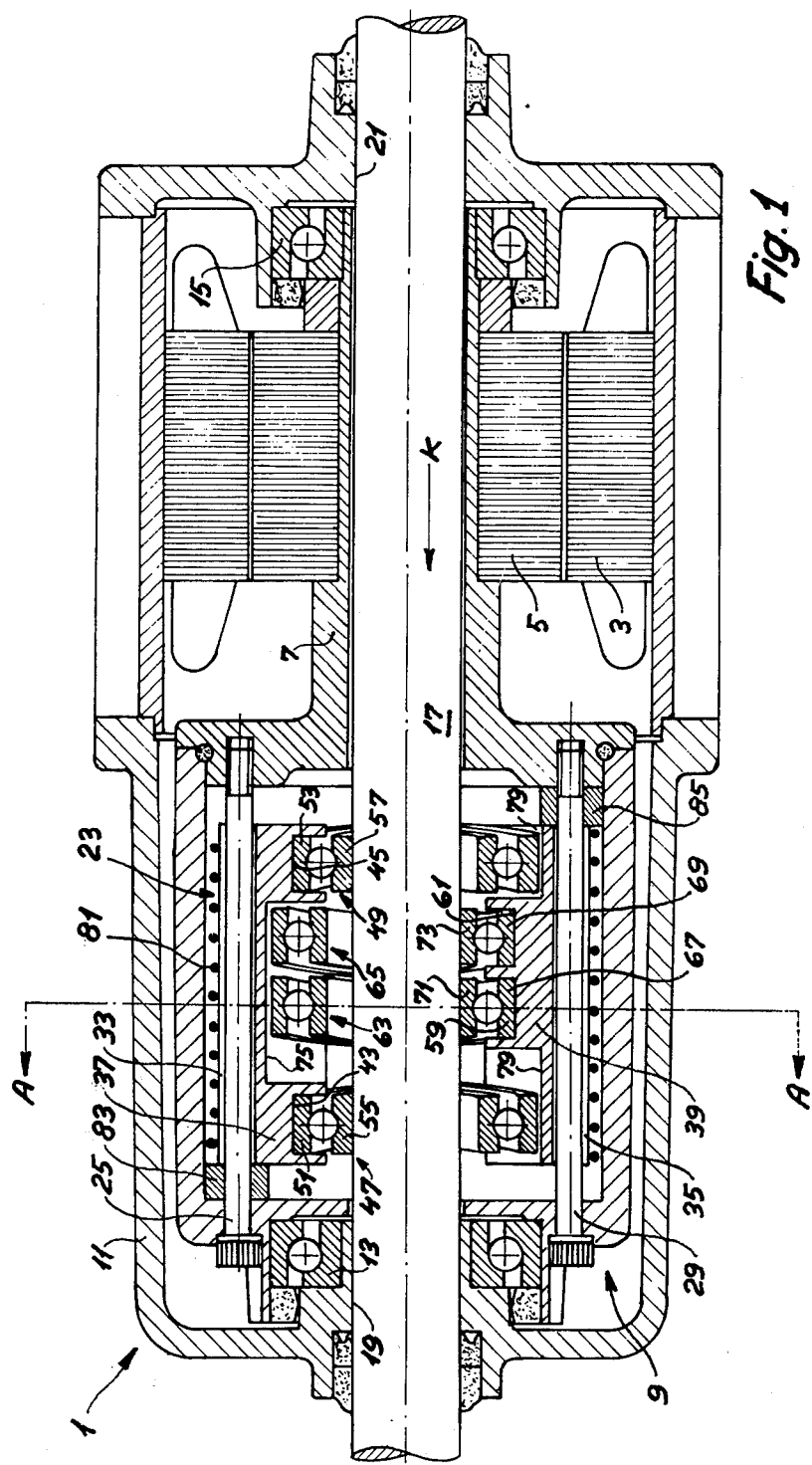

United States Patent [19]
Olrik

[11] 3,966,280
[45] June 29, 1976

[54] DEVICE FOR CONVERTING ROTARY MOTION TO AXIAL MOTION AND A METHOD OF APPLYING THE DEVICE FOR TRUING, POLISHING OR CALIBRATING A BODY OF ROTATION

[76] Inventor: Henrik Gerner Olrik, Bakkegaardsvej 413, 3050 Humlebaek, Denmark

[22] Filed: Dec. 17, 1974

[21] Appl. No.: 533,724

[30] Foreign Application Priority Data
Dec. 17, 1973 Denmark .......................... 6826/73
Feb. 25, 1974 Denmark ............................ 990/74
Sept. 16, 1974 Denmark .......................... 4850/74

[52] U.S. Cl. .......................... 308/176; 308/189 R; 308/199
[51] Int. Cl.² .......................................... F16C 19/04
[58] Field of Search ................ 308/176, 189 R, 199; 74/25

[56] References Cited
UNITED STATES PATENTS
2,940,322  6/1960  Uhing .................................. 74/25 X
3,789,678  2/1974  Gartner ............................. 74/25 X Primary Examiner—John J. Love
Attorney, Agent, or Firm—Fleit & Jacobson

[57] ABSTRACT

This invention concerns an apparatus for the conversion of a rotary motion into an axial motion, said apparatus comprising a number of rolling bearings having larger inner diameter than the outer diameter of a shaft, which extends through the bearings in such a manner that the bearings exert radial forces on the shaft, the vectorial sum of said forces being equal to zero. Each bearing is supported in a recess in one of two or more jaws, said recesses being arranged so that the axis of each bearing is inclined relatively to the axis of the shaft in such a way that each bearing will roll along a helical line on the surface of the shaft. The jaws are totated in common and the jaws are provided with clamping means adapted for increasing the radial forces against the shaft in response to the axial load on the shaft.

33 Claims, 15 Drawing Figures

DEVICE FOR CONVERTING ROTARY MOTION TO AXIAL MOTION AND A METHOD OF APPLYING THE DEVICE FOR TRUING, POLISHING OR CALIBRATING A BODY OF ROTATION

This invention relates to a device for converting rotary motion into axial motion and consisting in a friction unit comprising ball bearings of larger internal diameter than the external diameter of a shaft extending through the inner bearing rings, said ball bearings being so disposed that their inner rings exert radial forces on the shaft, the vector sum of which is substantially nought, and are inclined with respect to the shaft axis.

The invention thus concerns a device in which a rotary movement is converted to an axial movement, in that the inclined position of the ball bearings relatively to the shaft causes the inner rings of the bearings to move along a helical line on the shaft surface on the turning of the outer rings relatively to the shaft and around its axis. The intentional friction provided between the inner rings of the ball bearings and the shaft results in a relative axial displacement between the ball bearings and the shaft.

The prior art knows such devices, both of the type where the shaft rotates and is retained against axial movement and of the type where the outer rings of the ball bearings rotate and are retained against axial movement.

The known devices suffer from various disadvantages caused by the inexpedient manner in which the pressure of the ball bearings against the shaft is produced, and this pressure is essential for obtaining the required high frictional force between the inner rings of the ball bearings and the shaft.

Of the said disadvantages may be mentioned severe demands with respect to production tolerances for the retaining members in which the ball bearings are mounted, besides which the retaining members must be sturdy to be able to receive the pressure of the ball bearings against the shaft and this would make them unfit as rotating members. In the known devices the contact pressure of the ball bearings against the shaft is substantially constant and the shaft will therefore slide in the inner rings of the ball if it is exposed to a short-time overloading for the bearings and/or the shaft cannot stand a perpetual load sufficient to cope with such a contingency.

It is the object of the present invention to provide a selflocking friction device which does not require accurate production tolerances, which has a longer life than the known devices, and which is specifically suitable for receiving variable axial loads, no matter whether the rotating members are the outer rings of the ball bearings or the shaft.

This object has been accomplished by a device in which the friction unit comprises at least two ball bearing jaws in a retaining member adapted to produce relative rotation between the shaft and the ball bearing jaws, each of which is provided with recesses for supporting the outer ring of at least one ball bearing, said recesses being so inclined that the axis of each ball bearing forms an angle with the plane defined by the shaft axis and the abutment of the inner ring of the said ball bearing against the shaft, and comprises clamping means adapted to clamp the ball bearing jaws more tightly against the shaft in response to an increase of the axial load on the shaft.

This specifically involves that the contact pressure of the ball bearings against the shaft will be determined by the load and that the shaft will not be subjected to pressure along the same helical line with the result that the life of the device will be longer. The load determined contact pressure further involves that the shaft will not slide in case of overloading and that it need not be tempered.

A simplification of the clamping means has been achieved by adapting the said members to clamp the bearing jaws more tightly against each other in response to a relative axial displacement of the jaws caused by an increased axial load on the shaft.

The dimension of the device transversely of the shaft has been reduced to a minimum by providing each jaw with additional recesses in which the ball bearings supported in the other jaw or jaws are freely movable.

In the specific embodiment the clamping members are rigid guide means engaging the jaws in a manner by which a relative axial displacement of the jaws will impart pivotal movement to the guide means. These means can be rapidly and automatically fitted in case of serial production. The said guide means may expediently consist in at least one ring which encloses the jaws and is provided with opposed cams directed and pressing against the outer surface of the jaws. The said cams may be tempered steel balls.

In a very simple embodiment which is easy and cheap in production the clamping means are elastic members connecting the jaws and the said elastic members may consist in at least one filament or wire wound around the jaws.

By arranging two ball bearing jaws substantially symmetrically one on each side of a first axial plane of the shaft and providing the retaining member with two end stops, one adapted to arrest the axial movement of one jaw when the shaft moves in one direction, the other adapted to arrest the axial movement of the other jaw when the shaft moves in the opposite direction, it has been achieved that the clamping means will press the ball bearings more tightly against the shaft when one jaw abuts on one of the end stops while the other jaw is displaced further than the first jaw in the same direction. The two end stops may be staggered to the same side of a second axial plane perpendicular to the said first axial plane, and thus the jaw resting against an end stop will twist slightly in relation to the other jaw so as to create a difference of pitch between the ball bearing sets of the two jaws with the result that the clamping means will clamp the jaws still more tightly against the shaft. In a very simple manner of mounting the jaws in the retaining member one of the jaws is retained against movement in the axial direction of the shaft.

In a further embodiment comprising two jaws each jaw is guided by a carrier member each end of which is slidably supported in the retaining member in a manner which prevents pivotal movement, each carrier member having at least one end guide faces cooperating with guiding surfaces of the jaw and comprising two faces which are inclined with respect to the axial direction of the shaft, one forming an angle to one side of the said axial direction, the other an angle to the other side of the axial direction, the carrier members of the two jaws being disposed opposite each other and pressure springs being provided between the retaining member and the said one end of each jaw. Here the shaft does not as in the previously described embodiments slide in the inner rings of the ball bearings in response to a relative axial movement of the jaws, but the axial directions of the ball bearings cause a slight change in response to the load on the shaft so that the relative position of the jaws is changed without sliding of the inner rings of the bearings on the shaft.

By resting each of the said springs on an abutment in the retaining member and making this abutment adjustable in the axial directions of the shaft it will be possible to adjust the pitch of the ball bearings so as to provide linear contact between the ball bearings and the shaft. The guide faces expediently comprise two parts forming different sized angles with the said axial direction and the guide face part forming the larger angle will then be located outermost at the end of the carrier member where the said springs are provided.

In the above described embodiments the clamping means are adapted to clamp the jaws against each other in response to a relative axial displacement between the jaws. It may in certain cases be a drawback that the jaws are displaced relatively in the axial direction since it involves that the shaft will slide somewhat in the inner rings of the ball bearings unless provision is made to avoid this, and the clamping means should therefore be adapted to clamp the jaws more tightly against the shaft in response to an increase of the axial load on the shaft substantially without relative axial displacement of the jaws. For this purpose the clamping means may comprise a rigid ring enclosing the ball bearing jaws and adapted to exert pressure on the shaft in response to a common displacement of the jaws in the direction of load caused and determined by the axial load on the shaft. The extent of the said rigid ring in the axial direction of the shaft may be a fraction of the length of the ball bearing jaws, and the ring is mounted with its axis coincident with the shaft axis when the device is unloaded and secured to each jaw by means of a pair of journals disposed diametrically in the ring extending into holes aligned therewith in the ball bearing jaws, the parallel axes of the two pairs of journals extending closely adjacent to the said axial plane of the shaft at a predetermined distance. The retaining member has two abutments disposed so that the ring, irrespective of the direction of the axial load on the shaft, will tilt to the same side and thus urge the jaws against the shaft when it is loaded in the axial direction. At least one of the said abutments is adjustable in the axial direction of the shaft.

The extent of the ring and the ball bearing jaws in the axial direction may also be substantially the same and for each ball bearing jaw there may be provided a pair of recesses which are symmetrical with respect to a plane through the shaft axis and perpendicular to the said axial plane of the shaft, one recess of a pair of being provided in the inner surface of the ring and the other recess of the pair being provided in the outer surface of the corresponding ball bearing jaw, the bottom of at least one of a pair of recesses forming an angle different from nought with the shaft axis for co-operation with the corresponding inclined face of a wedge-shaped carrier member, said carrier members being supported in a radial groove in the end walls of the retaining member so that the heavy ends of the two wedges face opposed walls of the retaining member. Between the cooperating surfaces of the recesses and the carrier members may be provided anti-friction means, for instance tempered steel rolls, and the carrier members may be adjustable in the axial direction of the shaft.

One of the two ball bearing jaws disposed one on each side of a first axial plane of the shaft may be rigidly connected to the said rigid ring while the side of the other jaw facing away from the shaft has a recess extending parallel to the shaft and symmetrical with respect to a second axial plane through the shaft axis and perpendicular to the said first axial plane, the said recess being aligned with a recess in the inner surface of the ring so as to form on either side of a carrier member extending through the recesses and supported in grooves in opposed walls of the retaining member two channels extending in the direction of the shaft, the width of at least one channel measured perpendicular to the shaft varying periodically in the direction of the shaft. The ring may further be provided with means for retaining the ball bearing jaws against axial displacement relatively to the ring. The width of one channel may be adapted to vary periodically while the width of the other channel is retained constant, and at least one channel may contain tempered steel balls.

Between one of the two ball bearing jaws which are retained against axial displacement and a carrier member whose ends are supported in radial grooves in opposed end walls of the retaining member may be provided means for preventing rotation but permitting axial displacement of the ball bearing jaw relatively to the carrier member and clamping means for clamping the jaws together in response to their axial displacement in relation to the carrier member. The said means between one of the ball bearing jaws and the carrier member may be tempered steel balls disposed in opposed axial grooves in respectively the ball bearing jaw and the carrier member, and the said clamping means may be at least one elastic wire or filament wound around the carrier member and the second ball bearing jaw.

The cross section of the inner surface of the inner ring of each ball bearing may have convexity facing the shaft such that the said surface contacts the surface of the shaft along a generating line for the shaft surface over substantially the entire width of the ball bearing, and to obtain increased friction between the inner rings and the shaft the inner surface of the inner ring of each ball bearing may be provided with a plurality of elevations of substantially arched cross-section and disposed side by side.

The invention also comprises a method in which the above described device is applied for truing, polishing or calibrating a body of revolution, such as for instance a cylindrical shaft.

When truing a shaft, for instance, the shaft is subjected to opposite directed radial forces, distributed continuously or discontinuously in the axial direction. The said forces are provided in known manner by a plurality of cylinders or discs rolling outwardly of shafts while exerting the radial forces, the magnitude of which determines the truing effect when the distance between the points of application has been determined.

It is known that the so-called Hertz pressure (specific pressure) is relatively large in case of external rolling, which is a drawback where the shaft to be trued is soft and has a relatively high amount of resistance. In the truing of stainless shafts the shafts will be subjected to a predetermined Hertz pressure by which the stainlessness will be increased. Besides a reduction of the Hertz pressure to below the minimum value obtainable for external rolling there is thus also a need for controlling the effect on the surface of the body of revolution caused by the truing operation.

This method is specific in that the treatment is carried out by passing the body of revolution through the friction unit of the invention and involves the advantage that the absolute radial force applied to the body, the specific pressure produced thereby and a possible axial surface pressure can be varied from very small to very high values.

In the truing of a body of revolution a large radial force and a small specific pressure are required in order that the surface be affected as little as possible. This has been achieved by the internal rolling. A different inclination of the bearings will cause sliding of the body of revolution in the bearings and thus have a polishing effect. When calibrating a body of revolution the specific pressure shall exceed the yield point, which has been achieved either by grinding the inner rings so that they engage the body of revolution substantially in one point or by turning the bearings so that the inner rings engage the body of revolution substantially only at the edges of the inner rings.

To obtain a clean and effective rolling of the inner rings on the surface of the body of revolution without or substantially without polishing the ball bearings of the friction device have been so inclined in the jaws that the respective inner jaws move on the body of revolution along helical lines having the same pitch.

To ensure that the body of revolution will slide in at least one of the ball bearings of the friction device so that the surface will be treated in axial direction and a marked polishing effect obtained at least one ball bearing of the device is so mounted that its inner ring, if it were operated alone, would move on the body of revolution along a helical line having a pitch different from that of at least one of the other ball bearings.

By holding the retaining member of the friction device against rotating movement a satisfactory control of the body of revolution has been achieved in that it will be easier to make sure that the body of revolution is straight when rotating.

Figure 2:
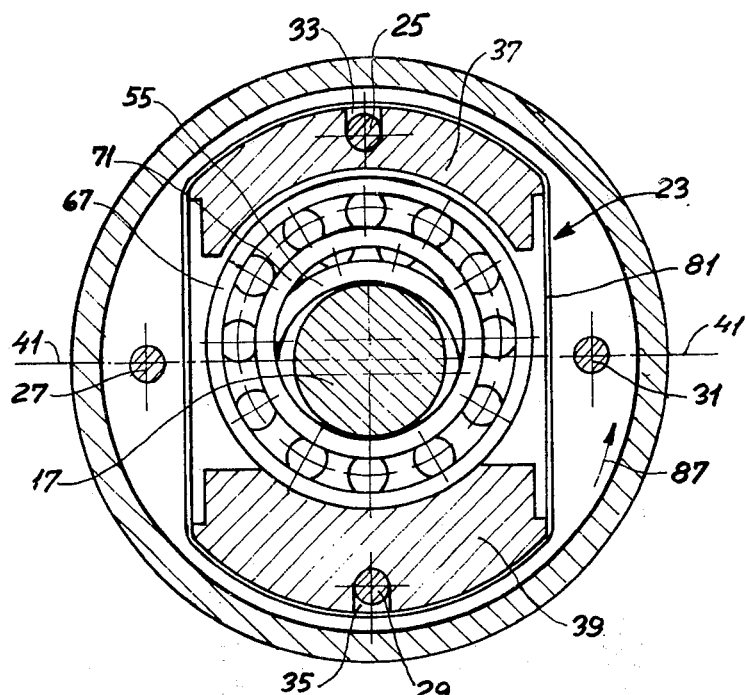
Figure 3:
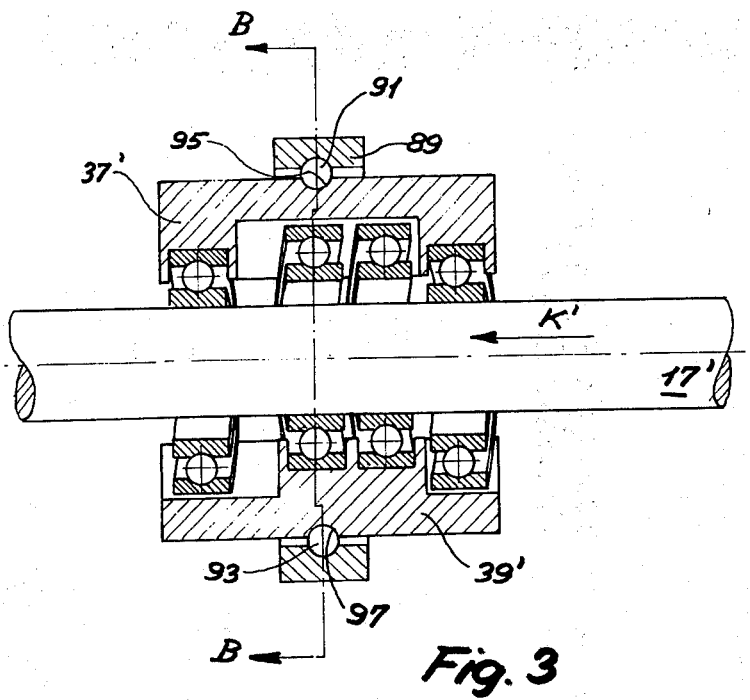
Figure 4:
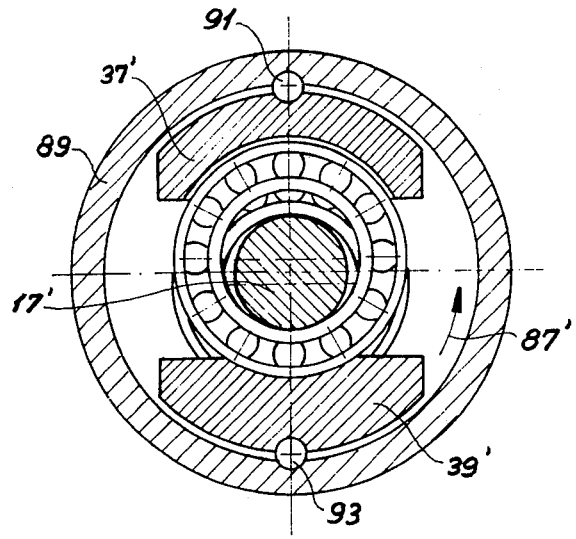
Figure 7:
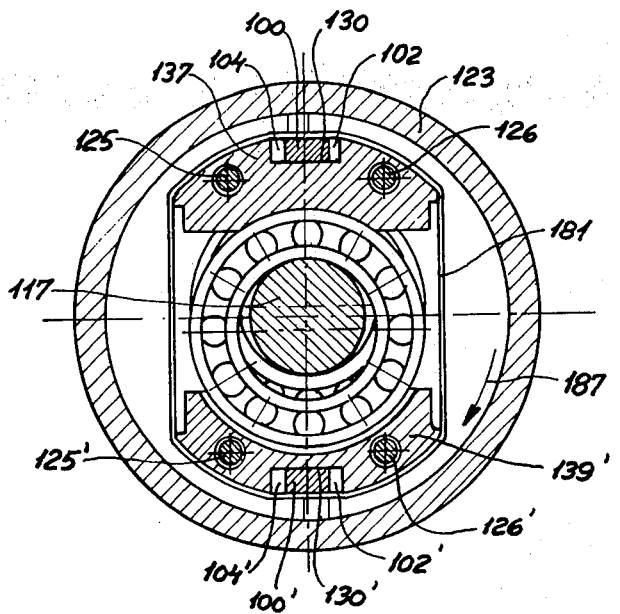
Figure 5:
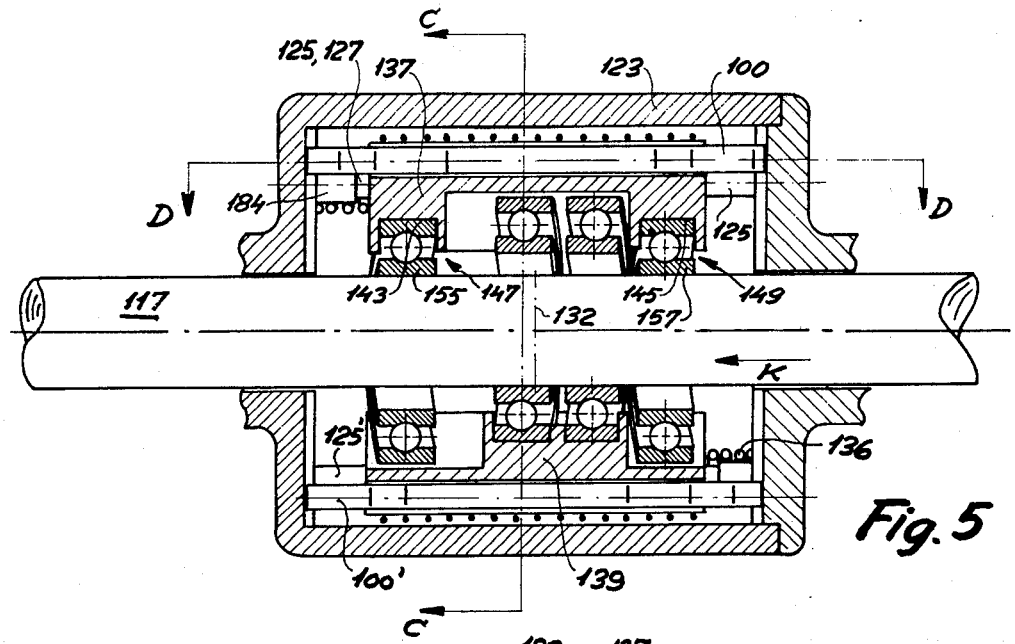
Figure 6:
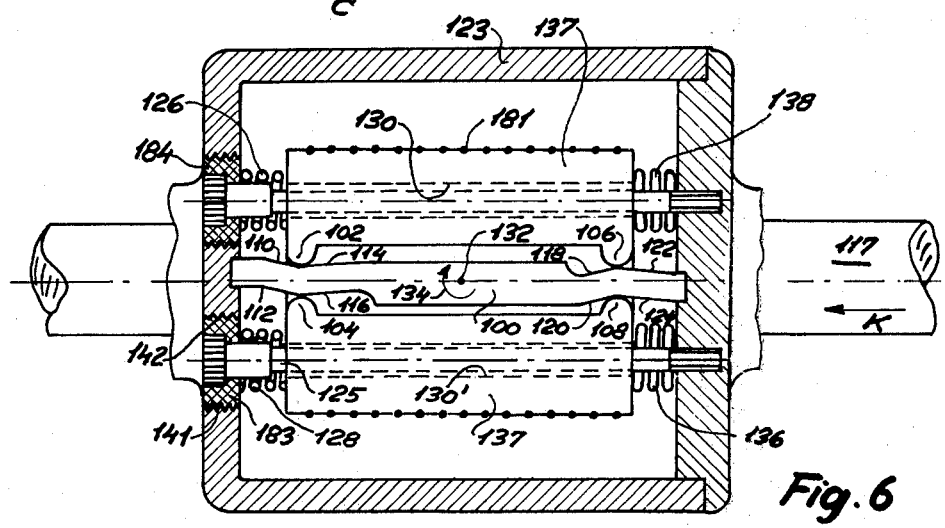
Figure 8:
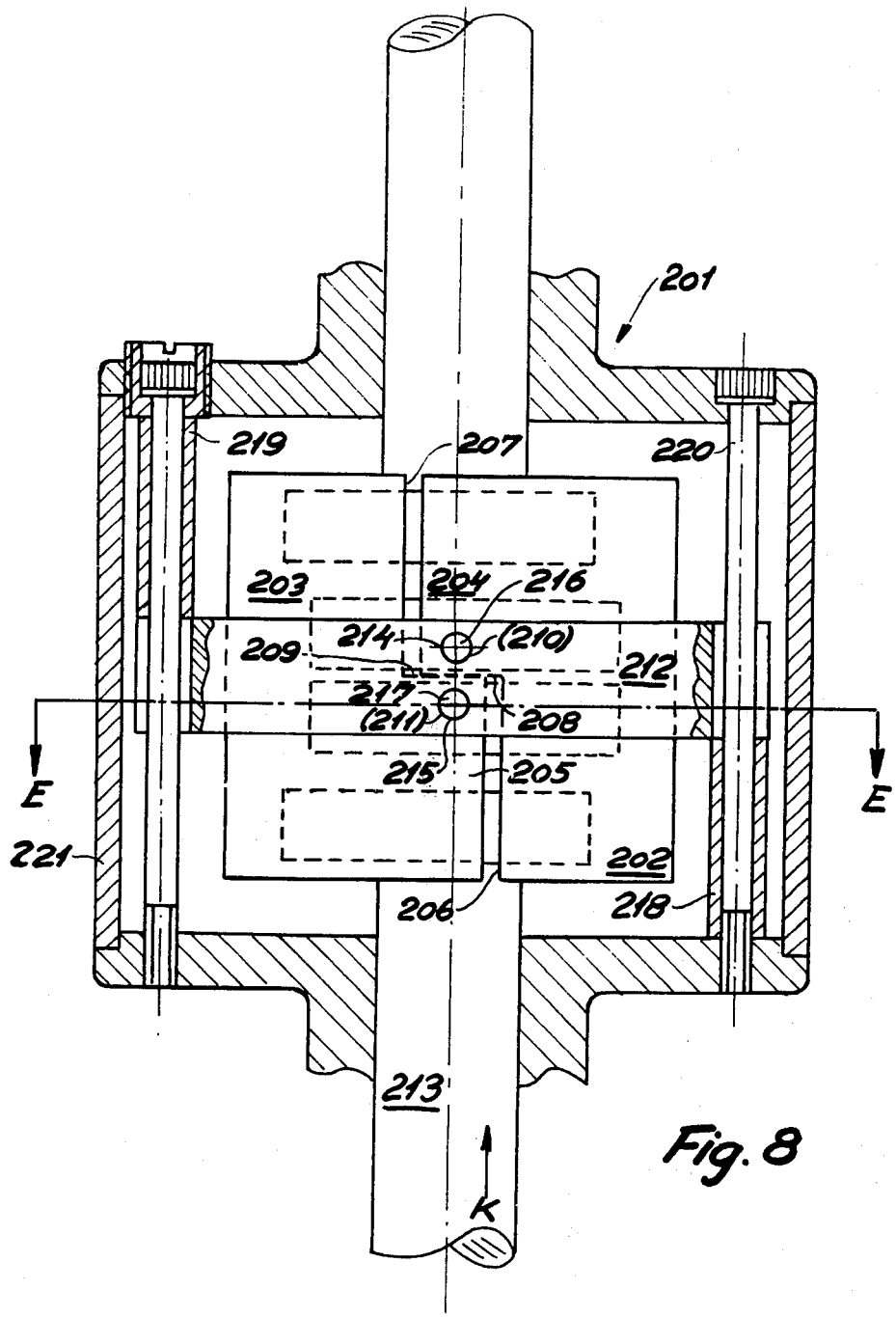
Figure 9:
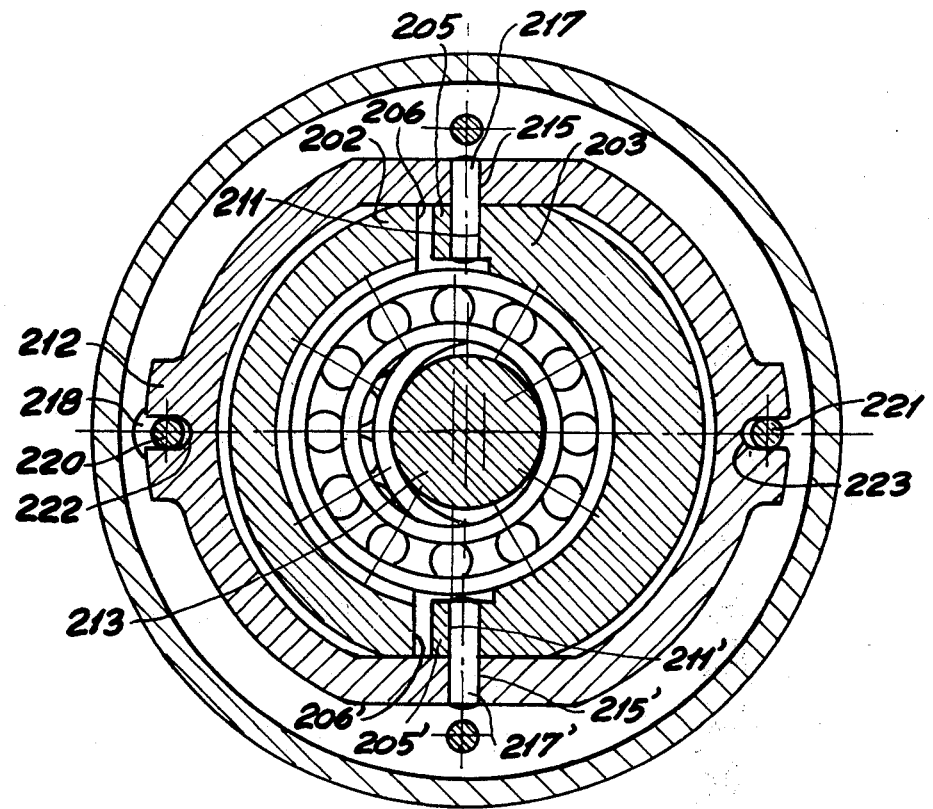
Figure 10:
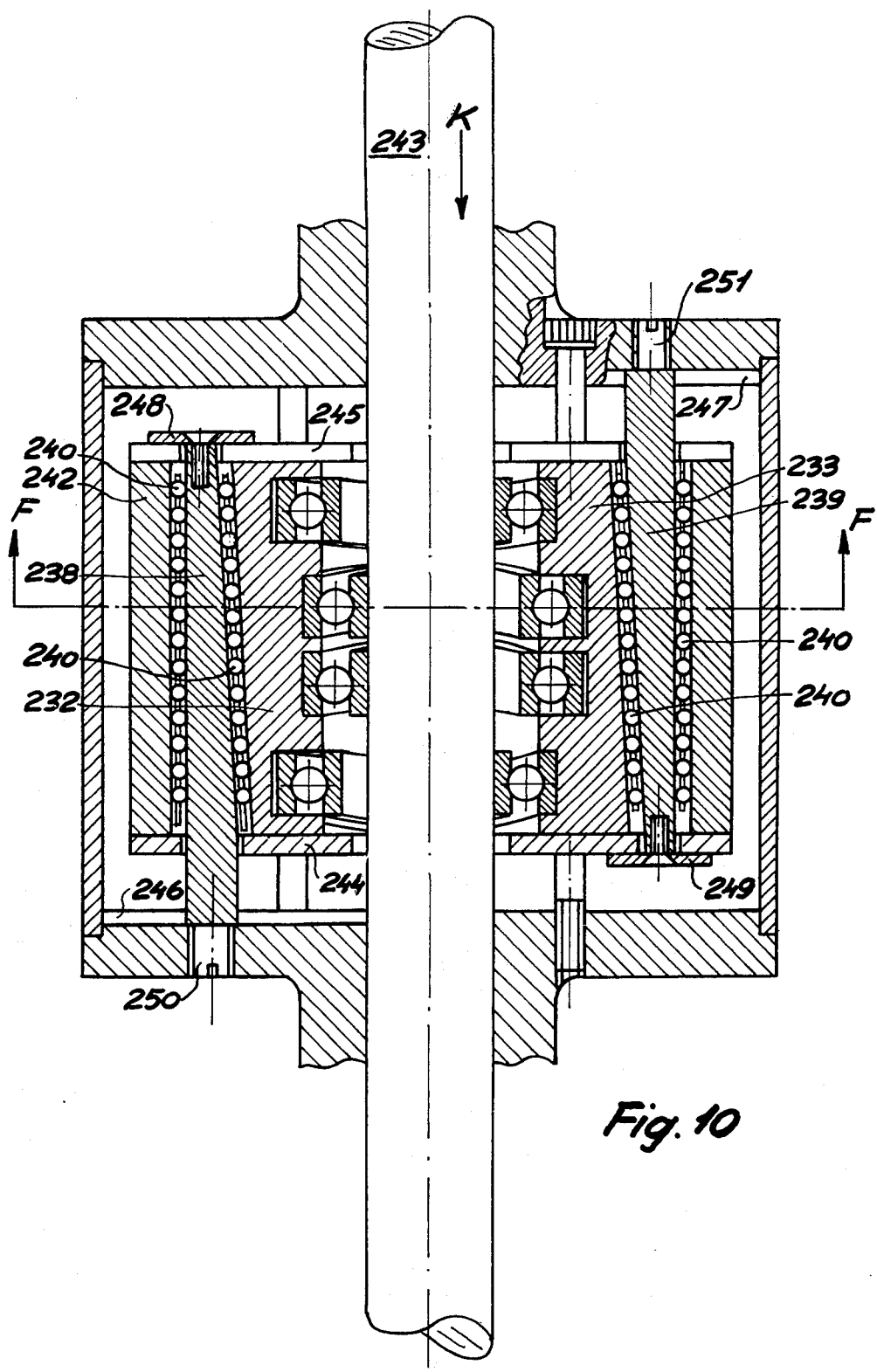
Figure 11:
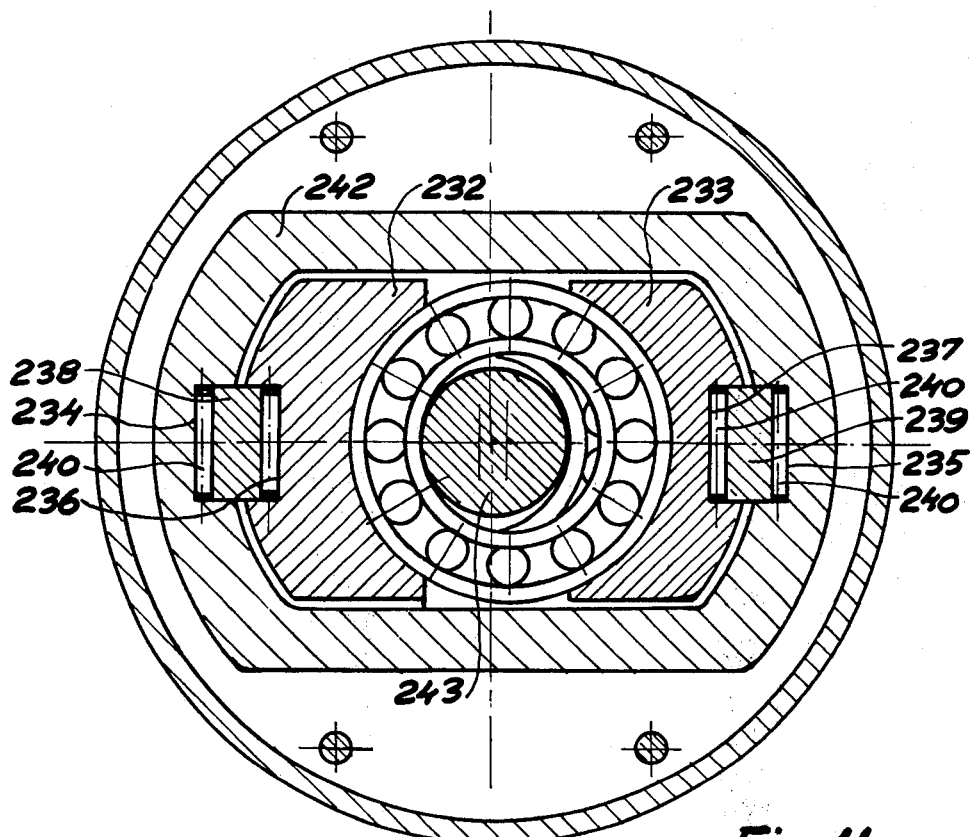
Figure 12:
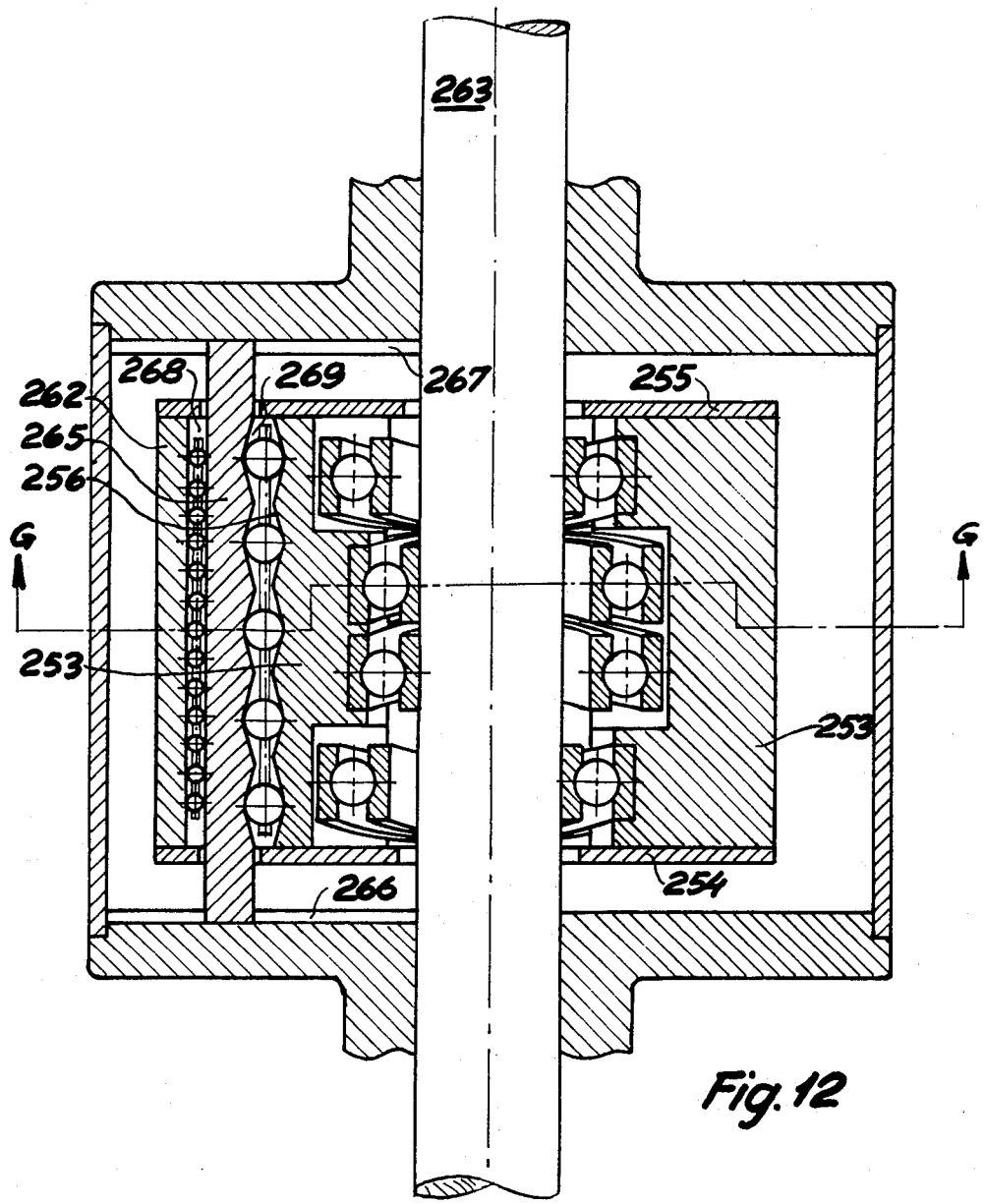
Figure 13:
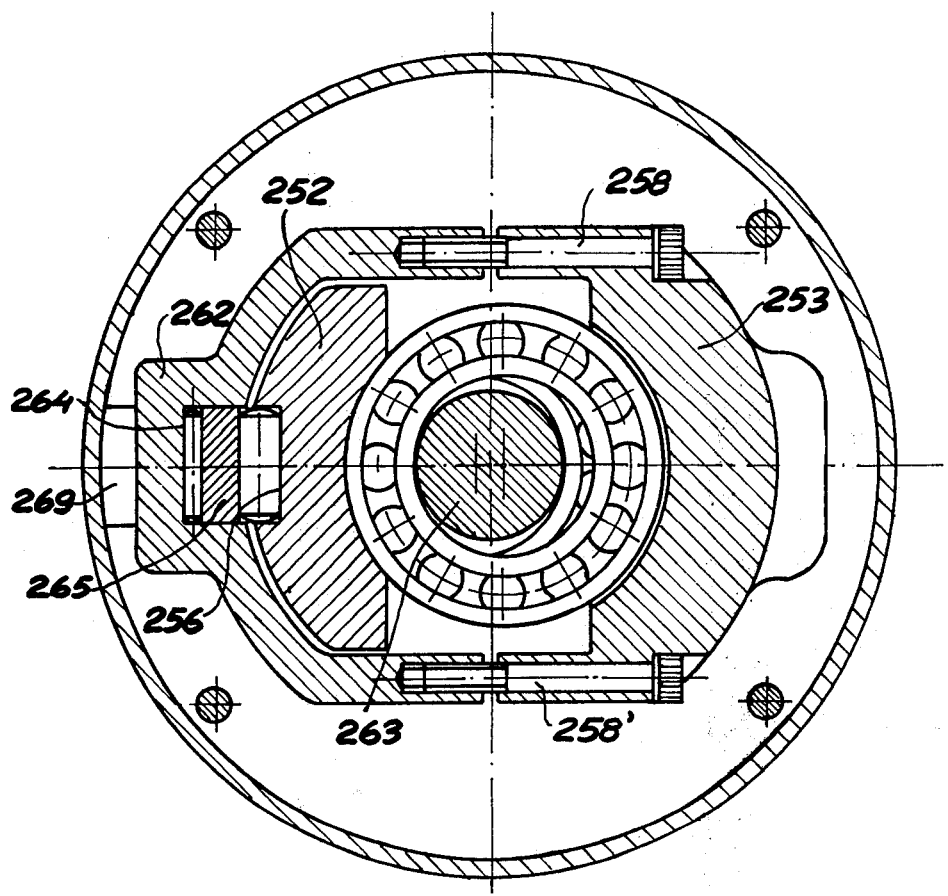
Figure 14:
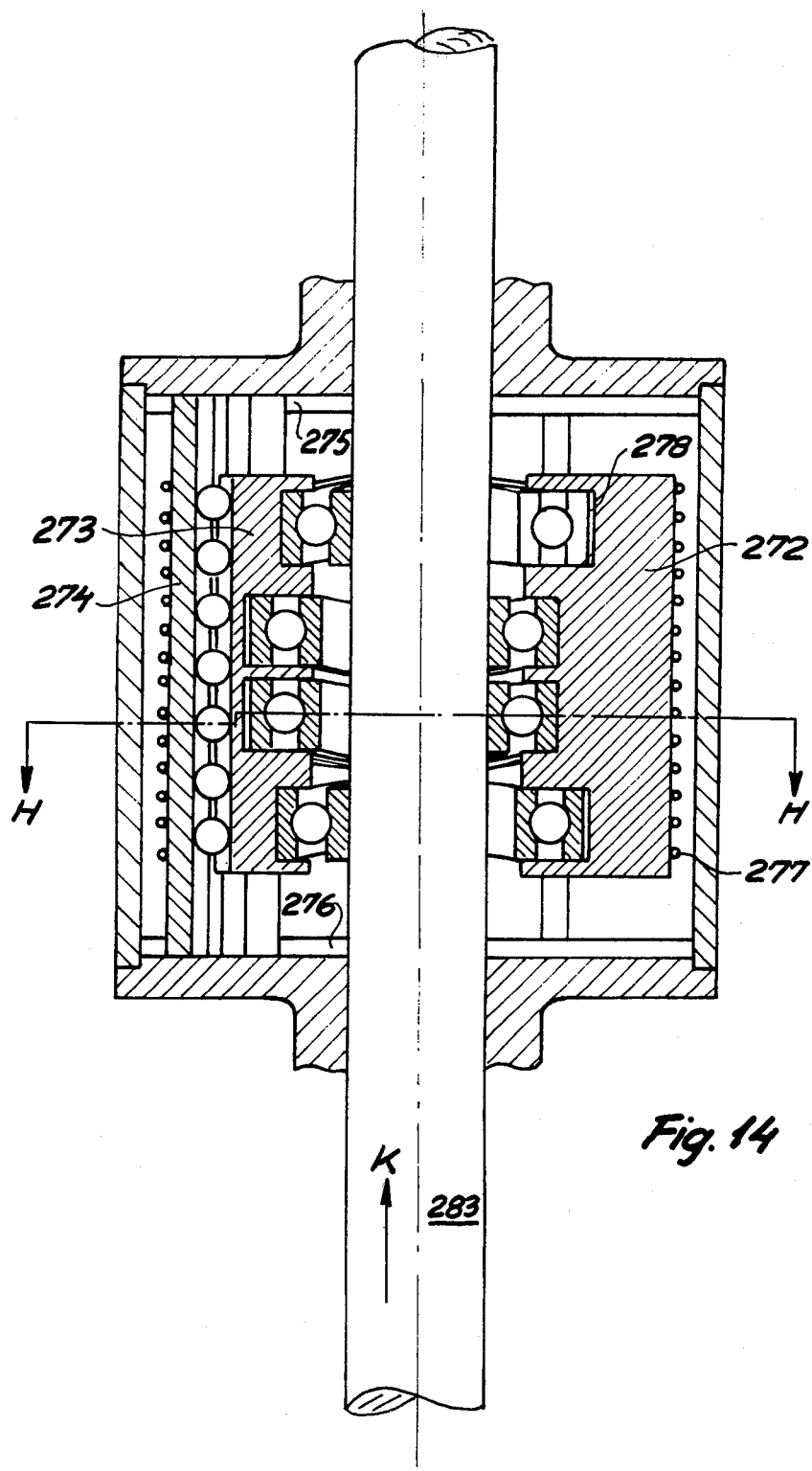
Figure 15:
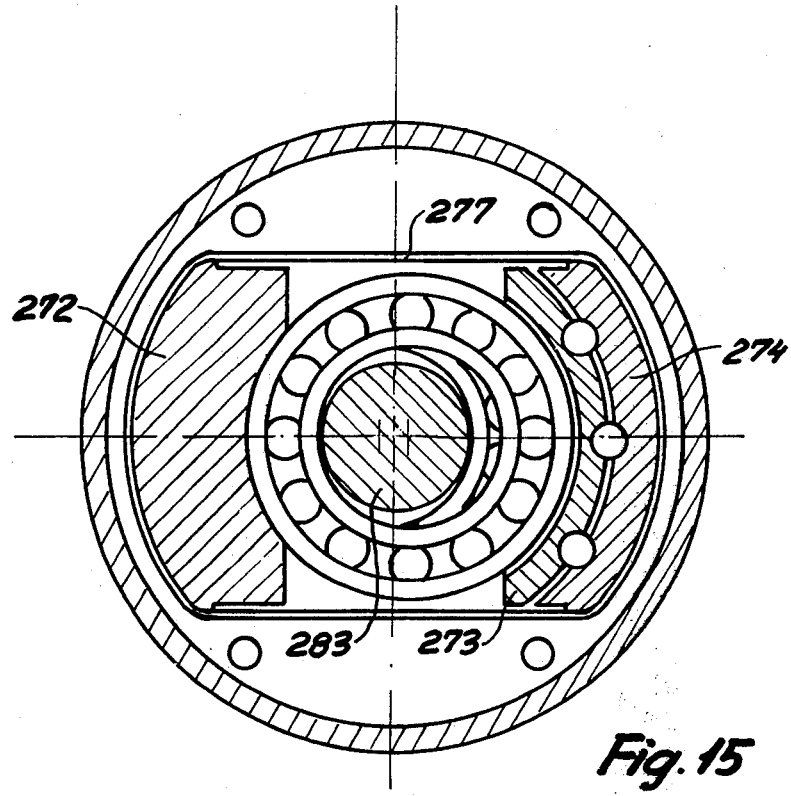

The invention will be explained in greater detail below with reference to the drawing, in which FIG. 1 presents a first embodiment of the device according to the invention, FIG. 2 presents a section through the device of FIG. 1 along the line A—A, FIG. 3 shows a second embodiment of the device according to the invention, FIG. 4 is a section along the line B—B in FIG. 3, FIG. 5 shows a third embodiment of the device according to the invention, FIG. 6 presents a section along line D—D in FIG. 5, FIG. 7 a section along line C—C in FIG. 5, FIG. 8 illustrates a fourth embodiment of the device according to the invention, FIG. 9 is a section through the device of FIG. 8 along the line E—E, FIG. 10 illustrates a fifth embodiment of the device according to the invention, FIG. 11 is a section through the device shown in FIG. 10 along the line F—F, FIG. 12 shows a sixth embodiment of the device according to the invention, FIG. 13 presents a section along the line G—G in FIG. 12, FIG. 14 shows a seventh embodiment of the device according to the invention, and FIG. 15 is a section through the device shown in FIG. 14 along the line H—H.

FIG. 1 illustrates an embodiment of the device according to the invention where the device 1 comprises a motor with a stator 3 and a rotor 5 rigidly connected through a hollow motor shaft 7 to a friction unit 9. The said members are enclosed in a housing 11 in which the rotating members are mounted by means of ball bearings 13 and 15 adapted to receive pressure in the axial direction of the ball bearings. Throughout the device extends a shaft 17 mounted in slide bearings 19 and 21 which form part of the housing 11.

The friction unit 9 comprises a retaining member 23 (see also FIG. 2) which is clamped by means of stay bolts 25, 27, 29 and 31 to a flange on the motor shaft 7. The stay bolts 25 and 29 extend through bores, 33 and 35 respectively, in two ball bearings jaws, 37 and 39 respectively. The ball bearings jaws are disposed symmetrically one on either side of an axial plane of the shaft 17 comprising by the line 41—41 in FIG. 2. The ball bearing jaw 37 is provided with recesses 43 and 45 for supporting the outer rings, 51 and 53 respectively, of the two ball bearings 47 and 49. The ball bearing jaw 39 is likewise provided with recesses 59 and 61 for supporting the outer rings, 67 and 69 respectively, of the ball bearings 63 and 65. Finally, the jaws 75 and 79 have recesses, in which the ball bearings, 63, 65 and 47, 49 respectively, are freely movable in the axial direction of the shaft 17. The recesses 43 and 45 are formed so that the axes of the ball bearings 47 and 49 define a certain angle with the axial direction of the shaft 17, and the recesses 59 and 61 are formed so that the axes of the ball bearings 63 and 65 define the same angle in reverse with the axis of the shaft 17. As will be seen in FIG. 1 and partly in FIG. 2, the inner rings, 55 and 57 respectively, of the ball bearings 47 and 49 abut on the shaft 17 along a generating line for the shaft surface, said generating line being disposed diametrically with respect to a second generating line along which the inner rings, 71 and 73 respectively, of the ball bearings 63 and 65 abut on the shaft 17. The contact pressure of the ball bearings against the shaft in the neutral position of the jaws, that is when no axial force is applied to the shaft 17, is determined by the tension of a piano wire 81 which is wound around the jaws 37 and 39. In the housing 11 is further provided two end stops 83 and 85 staggered to the same side of a plane containing the shaft axis and perpendicular to the said axial plane.

The operation of the device illustrated in FIGS. 1 and 2 will be explained below. When the motor rotates the stay bolts 25 and 29 will act as carrier members for the ball bearing jaws, 37 and 39 respectively, and cause them to rotate, for instance in the direction indicated by the arrow 87. When the ball bearings 47, 49, 63 and 65 are located as above described they will move along a helical line on the surface of the shaft 17, the pitch being determined by the angle formed by the axes of the ball bearings with the shaft axis. The housing 11 being controlled so that the friction unit 9 is retained against axial movement, the shaft 17 will move to the right when the friction unit rotates in the direction indicated by the arrow 87, at a rate determined by the angular velocity of the friction unit and the pitch of the said helical line, provided, that is, that the shaft 17 is retained against rotation.

When a lefthand-directed force (K in FIG. 1) is applied to the shaft 17 in the above described motion the said force will partly be transmitted through the ball bearing jaw 37, the end stop 83, the retaining member 23 and the ball bearing 13 to the housing 11 and partly to the ball bearing jaw 39, which is thereby caused to move a distance to the left of the ball bearing jaw 37, which movement will be arrested by the piano wire 81, which will clamp the jaws more tightly against the shaft in response to the force applied thereto, which will be transmitted solely through the end stop 83 when the motion of the jaw 39 has been arrested. It will be readily seen that the result is a load-determined contact pressure on the shaft 17, so that the force applied to the shaft 17 and the ball bearings 47, 49, 63 and 65 will never exceed the required value determined by the force K, and so that heavy shorttime loads will not cause the shaft 17 to slide in the ball bearings, which will not be affected adversely by a shorttime overloading. When the friction unit 9 does not rotate the contact pressure on an unloaded shaft will be determined by the initial tension of the piano wire 81, and when the shaft is loaded the contact pressure will be increased as a result of the relative displacement of the ball bearing jaws. Thus it will be seen that the friction unit 9 is self-locking both when the friction unit is at rest and when it rotates.

The end stops 83 and 85, as already mentioned, are staggered to the same side at right angles from a plane including the axes of the shaft 17 and the stay bolts 25 and 29. This is expedient, for the slight clearance between the stay bolts 25 and 29 and their respective bores 33 and 35 will cause such a twist of the ball bearing jaw 37 as to slightly reduce the pitch of the ball bearings 47 and 49 (provided, that is, that the direction of rotation is as indicated by the arrow 87 and that the shaft 17 in FIG. 1 is subjected to the force K). On account of the relatively higher pitch of the ball bearing jaw 39 this jaw will tend to move more to the left than the ball bearing jaw 37, which, in connection with the piano wire 81 will cause the jaws to clamp the shaft 17 more tightly.

The application of the said piano wire 81 makes the production of the friction unit easy and cheap, and the demands with respect to production tolerances are not very rigorous.

The end stops may also be arranged to actuate only one of the jaws, for instance the jaw 37, in which case they will be staggered to either side of the said plane. When the outer axial force on the shaft 17 is reversed the jaw 39 moves from a position slightly to the left of the jaw 37 to a position slightly to the right of the same jaw, whereby the angle formed by the piano wire 81 from the vertical plane (FIG. 1) will be reversed and the grip of the jaws about the shaft 17 will be relaxed. If the outer force on the shaft 17 can be reversed the embodiment illustrated in FIG. 1 should therefore be preferred, the angle formed by the piano wire 81 from the vertical plane having the same sign under all loads. Instead of two end stops cooperating with but one jaw, the jaw may be clamped to the retaining member.

FIGS. 3 and 4 show another embodiment of the clamping means, which here consists of a rigid ring 89 clamping through two tempered steel balls 91 and 93 the ball bearing jaws 37' and 39' together with a predetermined force about the shaft 17'. The jaws 37' and 39' are identical with the jaws 37 and 39 in FIG. 1 with the exception of the countersunk sections 95 and 97 in the jaws 37' and 39' respectively. The unit shown in FIG. 3 could also be inserted in a retaining member and a housing as shown in FIG. 1 if account is taken of the outer diameter of the ring 89. The operation will be the same as described above, the jaw 37' with the direction of rotation indicated by the arrow 87' and with a force K' applied to the shaft 17' (FIG. 3) being retained against axial movement to the left by an end stop like the end stop 83 in FIG. 1. The jaw 39' is permitted to move further to the left than the jaw 37', whereby the ring 89 will be tilted about an axis perpendicular to the shaft axis and contained in the previously mentioned axial plane of the shaft. In FIG. 3 this tilting will be clockwise and it will be seen that the rigid ring 89 which rotates together with the jaws will clamp the jaws more tightly against the shaft 17'. As in the embodiment shown in FIG. 1, the reverse direction of rotation of the friction unit will cause the shaft 17, 17' to move to the left, and when the axial component of the force applied to the shaft 17, 17' is reversed the end stop 85 shown in FIG. 1 will retain the jaw 39 (and 39') against the right-hand axial movement while the jaw 37 (and 37') moves a distance to the right of the jaw 39 (and 39'). The piano wire will then clamp the jaws more tightly against the shaft and the aforesaid small difference of pitch would also be attained, the jaws 37' and 39' being rotatable in planes parallel to the said axial plane on account of the specific engagement between the ring 89 and the steel balls 91 and 93. It will also be possible to use a plurality of rings arranged side by side and suspended independently of one another in the same manner as the ring 89.

The embodiment presented in FIGS. 3 and 4 is advantageous for use in serial production in that the ring 89 can readily be fitted automatically.

In the embodiments described above the shaft will slide relatively to the ball bearing jaw resting on the end stop while the other ball bearing jaw moves relatively to the former. This has been avoided in the embodiment illustrated in FIGS. 5, 6 and 7, which is particularly expedient for the transmission of heavy forces. In these figures a reference numeral whose last two digits correspond to the numerals in FIGS. 1 and 2 signifies that the said member has the same function and is designed substantially in the same way as the members shown in FIG. 1.

The chief difference from the embodiment of FIG. 1 resides in the provision of a specific carrier member 100 and 100' which rotates the ball bearing jaws 137 and 139 together with the retaining member 123 and also guides the jaws around an axis 132 perpendicular to the previously mentioned axial plane.

The operation of this embodiment will be described below in greater detail, assuming that the retaining member 123 and with it the ball bearing jaws 137 and 139 rotate in the direction of rotation indicated by the arrow 187. When the shaft 117 is not subject to any external force but only retained against rotation it will move to the right while the ball bearing jaws will assume the position indicated in FIG. 6, apart from friction in the bearings that guide the shaft 117. When the shaft is subjected to a force K (FIG. 5, 6) the ball bearing jaws move to the left and the jaw 137 will move a distance such that the elastic force of the pressure springs 126 and 128 corresponds exactly to the force K applied to the shaft 117. By cooperation between the guideway 102 and the guide face 110 and between the guideway 108 and the guide face 120 the jaw 137 will be caused to rotate about the axis 132 in the direction indicated by the arrow 134. This reduces the pitch of the ball bearings 147 and 149 retained by the jaw 137 with the result that the jaw 139 moves faster to the left than the jaw 137. The jaw 139 is guided by a carrier member 100' which is arranged so that this jaw too is turned in the direction indicated by the arrow 134 about the axis 132, the guideway 102' cooperating with a guide face (not shown in FIG. 6) of the carrier member 100', said guide face having the same pitch as guide faces 122 and 124 shown in FIG. 6. It will be seen from FIG. 6 that the guide faces have two different pitch values in both directions so that if it assumed that the pitch of the guide face 110 is for instance five times that of the guide face 122 a movement of the jaw 137 a distance a to the left will cause the jaw 139 to move a distance 5xa to the left so as to produce the previously mentioned relative axial displacement between the jaws, whereby the piano wire 181 will clamp the jaws and thereby the ball bearings more tightly around the shaft 117. The guideway 108 and the guide face 120 ensures that the jaw 137 rotates about the axis 132, and the carrier member 100' having the same shape as the carrier member 100, a (not shown) guideway on the jaw 139 will cooperate with a (not shown) guide face on the carrier member 100' having the same pitch as guide faces 122 and 124 to cause also the jaw 139 to rotate about the axis 132. When the friction unit rotates in the opposite direction the shaft, as in the previously described embodiments, will move in the opposite direction and when the axial component of the force applied to the shaft is reversed the ball bearing jaw 139 will move a distance to the right in response to the action of the pressure springs 136 and 138 and otherwise as above described.

It will be seen that the sliding of the shaft in the ball bearings of the jaw that is arrested by an end stop, which was necessary in the previously described embodiments, has been obviated in that the jaw 137 is here permitted to move at a rate corresponding to the reduced ball bearing pitch and adjusted so that the jaw 139, which on account of the relatively higher ball bearing pitch moves at a relatively higher rate, reaches its position of rest simultaneously with the jaw 137 with a given load on the shaft 117. Thus the optimum operational condition is determined by the load on the shaft 117, the pitch of the ball bearings, the pitch of the guide faces, the elasticity constant of the pressure springs and the piano wire.

It will also be seen that the pitch of the ball bearings will be lower when the load on the shaft is higher, which will counteract overtaxing of the motor that drives the friction unit. This embodiment, in connection with the previously mentioned properties, is therefore particularly suitable for the transmission of heavy and variable forces.

A given friction unit can readily be adjusted to different load categories simply by replacing the pressure springs by springs with a different spring constant. Within each load category fine adjustment can be provided by making the abutment of the springs against the retaining member 123 adjustable in the direction of the shaft, so that the ball bearings can be contacted accurately with the shaft along a generating line for the shaft surface corresponding to the most frequently experienced load in the axial direction of the shaft 117. The abutment of the springs may be adjustable as indicated in FIG. 6, where the external thread 141 of the sleeves 183, 184, which serve also as limit stops in case of overloading, fits into the internal thread 142 of the retaining member 123 and where the threads may be formed so that the throughgoing stay bolts, 125 and 126 respectively, act as lock nuts for the sleeves, 183 and 184 respectively. The abutment for the springs 136, 138 are formed in the same way as the abutment for the springs 126, 128.

If there is no need for an inherent safeguard against overloading of the driving motor the friction unit may be constructed in other ways in which the tolerance requirements are less than for the aforesaid guide and guideways, and also the slide between the inner rings and the shaft has been obviated. In the following a few such embodiments will be described.

FIGS. 8 and 9 show an embodiment where each of the ball bearing jaws 202, 203 has elongated portions 204, 205 extending on both sides of the shaft 213 through the said axial plane into recesses 206, 207 in the opposed ball bearing jaw and having centrally disposed end surfaces 208, 209 abutting on each other in a plane perpendicular to the shaft. Each ball bearing jaw is provided adjacent to the end faces 208, 209 and to the axial plane with two aligned bearing bores 210, 210' and 211, 211' (210' and 211' being disposed on the opposite side of the shaft), which in turn are aligned with bearing bores 214, 215 in a rigid ring 212 which encloses both ball bearing jaws. The ring is secured to the ball bearing jaws by means of journals 216, 217 (and 126', 217') extending through adjacent aligned bearing bores. In the retaining member the ring abuts at the top and at the bottom on end stops, 218 and 219 respectively, the end stop 219 being adjustable in the axial directions of the shaft so that the ring can be caused to abut on both end stops at a right angle relatively to the shaft 213.

When the shaft is subjected for instance to the force indicated by K in FIG. 8 the ball bearing jaws 202, 203, which are retained by the journals against relative axial displacement, will move a short distance to the left, whereby the ring 212 in cooperation with the end stop 219 will tilt counterclockwise. Hereby the journals 216, 216' will be urged downwards while the journals 217, 217' will be urged upwards and the ball bearing jaws 202, 203 will be clamped against one another in response to the force K applied to the shaft 213. If the force K is directed opposite the ball bearing jaws 202, 203 will be actuated in the same way because now the ring 212 cooperates with the end stop 218. The stay bolts 220, 221 act as carrier members for the ring 212 in that the force is transmitted through recesses 222, 223 in the ring.

In the device illustrated in FIGS. 8 and 9 the ball bearing jaws will thus be clamped against the shaft in response to the load applied thereto and substantially without relative axial displacement between the ball bearing jaws. This embodiment does not require accurate production tolerances and the pressure on the shaft can for a given load K be increased by reducing the distance between the journals 216, 217, said distance being determined in relation to the desired force of friction between the inner rings of the ball bearings and the shaft 213.

In the embodiment illustrated in FIGS. 10 and 11 the ball bearing jaws are enclosed in their entire length by a ring 242. The ring 242, as indicated in FIG. 11, is provided with recesses 234, 235 in the inner surface and the ball bearing jaws 232, 233 with recesses 236, 237 in the outer surface, all extending parallel to the shaft 234. Through each pair of recesses, constituted by a recess in the ring and a matching recess in a ball bearing jaw, extends a carrier member 238, 239, said carrier members being engaged in radial grooves 246, 247 in opposed end walls of the retaining member. The surface of the carrier members which faces the shaft forms a certain angle with the shaft axis and is parallel to the bottom of the recesses 236, 237. The other, opposed surface of the carrier members extends parallel to the shaft and to the bottom of the recesses 234, 235 in the ring 242. The first and second surface of the carrier members contact the bottom of the recesses 236, 237 and 234, 235 respectively through tempered steel rolls 240. The side faces of the carrier members contact the sides of their respective recesses. The ball bearing jaws can be retained against relative axial displacement in that all recesses in the ball bearing jaws fit tightly about the outer rings of the bearings and/or by means of end flanges 244, 245 connecting the ring and the ball bearing jaws so as to permit relative movement of these members perpendicular to the shaft 243. When the device is unloaded the end flanges 244, 245 abut on end plates, 249 and 248 respectively, which are screwed on to the narrow end of the wedge-shaped carrier members, 239 and 238 respectively. When the shaft 243, for instance, is subjected to the force K indicated in FIG. 10 the ring and the ball bearing jaws will move jointly to the left towards the broad end of the carrier member 238 which is engaged in the radial groove 246 as explained below. This leaves a space between the end flange 245 and the plate 248, while the plate 249 will cause the carrier member 239 to follow and move partly out of engagement with the radial groove 247. Thus the distance between the ball bearing jaw 233 and the ring 242 will be maintained, and as a result of the slight upward movement in the groove 246 the carrier member 238 will cause the ball bearing jaws 232, 233 to be clamped more tightly about the shaft 243 in response to the force applied thereto.

If the force K is reversed the ball bearing jaws 232 and 233 will likewise be clamped more tightly about the shaft by means of the carrier member 239, which in this case engages the groove 247 while the carrier member 238 is partly withdrawn from the groove 246. The inclination of the inclined surfaces of the carrier member is determined by the desired force of friction between the shaft 243 and the inner rings of the ball bearings. The carrier members 238, 239 are adjustable in the axial directions of the shaft by means of screws 250, 251.

FIGS. 12 and 13 illustrate an embodiment in which the ring 242 shown in FIG. 10 is permanently connected to one of the ball bearing jaws 253, the other ball bearing jaw 252 being retained against axial movement in relation to the ball bearing jaw 253 by means of end flanges 254, 255. The ball bearing jaw 252 is provided in the outer surface with a recess 256 extending parallel to the shaft 263 and symmetrical with respect to a plane through the shaft axis perpendicular to the said axial plane. One half of the ring 242 shown in FIG. 10 is here (FIG. 13) a U-shaped cup 262 secured by means of screws 258, 258′ to the ball bearing jaw 253, which forms the second half of the said ring. The cup 262 has an internal recess 264 in the bottom aligned with the recess 256 in the ball bearing jaw 252. A carrier member 265 extends through opposed recesses and parallel to the shaft 263. The carrier member is journalled in radial grooves 266, 267 in opposed end walls of the retaining member. The rotary force is transmitted through the grooves to the carrier member, which in turn transmits the force to the cup 262, in that the short faces of the carrier member 265 (FIG. 13) abut on the faces of the recess 264 in a plane perpendicular to the said axial plane. The carrier member 265 defines a first channel 268 between the upper face of the carrier member (FIG. 13) and the bottom of the recess 264 and a second channel 269 between the opposed downwardly facing surface of the carrier member and the bottom of the recess 256 in the ball bearing jaw 252. The first channel, as shown in FIG. 12, is of constant cross-section and contains tempered steel rolls, which the bottom of the recess 256 is formed relatively to the downwardly facing surface of the carrier member 265 so that the second channel 269 presents perpendicularly to the shaft a cross-section that varies periodically along the shaft 263. The channel 269 contains steel rolls of a diameter corresponding to the greatest distance between the bottom of the recess 256 and the opposed surface of the carrier member 265.

The operation is the same as explained in respect of the embodiment shown in FIG. 10, in that the ball bearing jaw 233, the carrier member 239 and the ring 242 of FIG. 10 may be equated to the ball bearing jaw 253 of FIG. 12, while the carrier members 238, 239 have been replaced by the single carrier member 265 with inclined faces adapted to produce the pressure of the ball bearing jaws against the shaft 263 no matter in which direction the force is applied to the shaft. As compared with the embodiment of FIG. 10, the embodiment of FIG. 12 has the advantage that the carrier member 265 is subjected to a uniform load.

FIGS. 14 and 15 illustrate an embodiment of the device in which a carrier member 274 extends parallel to the shaft 283 and closely adjacent to the outer surface of one of the ball bearing jaws 273. The ends of the carrier member are engaged in radial grooves 275, 276 in opposed end walls of the retaining member. In the inner surface of the carrier member and in out outer surface of the ball bearing jaw 273 are provided three pairs of opposed grooves parallel to the shaft 283 and containing tempered steel balls held in their relative positions by means of ball holders. By means of the said three axial grooves the ball bearing jaw 273 and the carrier member 274 are retained against relative rotation about the shaft 283 while the ball bearing jaw 273 can be displaced axially in relation to the retained carrier member 274. A piano wire 277 is wound around the carrier member 274 and the second ball bearing jaw 272.

The recesses in the ball bearing jaws 272, 273 for retaining the four ball bearings fit tightly about the end faces of the outer rings, and the ball bearing jaws will thus be retained against relative axial displacement so that both ball bearing jaws are moved jointly to the left when the shaft 283 is subjected to the force K indicated in FIG. 14, while the ball bearing jaw 273 rolls on the retained carrier member 274. As a result of the relative axial displacement between the ball bearing jaws (especially jaw 272) and the carrier member the piano wire 277 will cause the ball bearing jaws to be clamped more tightly about the shaft 283 and the applied force will be distributed equally among the jaws, the carrier member 274 being movable in the grooves 275, 276 perpendicular to the shaft 283. To provide for the elastic deformation of the members there is a clearance 278 between the arcuate surface of the arrangement. The radial pressure may be varied from practically nought to very high pressures, which will be absorbed by the rigid ring 242.

In the truing of a shaft the radial forces shall produce a bending moment acting on the shaft just above the elastic limit if there is an untrueness, whereas the specific pressure in the points of application of the forces must at no time exceed the elastic limit. The specific pressure may be reduced by employing the device of the invention, the shaft of which rolls within the bearing, whose diameter need be but slightly greater than the shaft diameter. To further reduce the specific pressure the inner rings may be for instance elliptically ground, particularly where the pitch of the helical lines is high, so that they will engage the shaft over the entire width of the bearing.

If the inclined position of at least one of the bearing is different from the inclination of the other bearings the shaft will slide in the inner ring of that bearing and thus be polished.

By increasing the internal diameter of the bearings in relation to the shaft diameter and either inclining the bearings or grinding the inner rings to produce marked elevations, the specific pressure may be brought above the elastic limit and thus the shaft will be calibrated.

If the shaft suffers from marked untrueness it will be an advantage to employ the unit illustrated in FIG. 2, in which the untrueness may be absorbed by the piano wire 81 to protect against overloading of the ball bearings. By replacing the piano wire 81 by spring means of a type that exhibits a constant spring force within a limited elongation the unit shown in FIG. 12 can be used for the truing of conical bodies of revolution. Such bodies can also be polished or calibrated by positioning the ball bearings and/or grounding their inner rings as above described.

What I claim is:

1. A device for converting rotary motion into axial motion and consisting in a friction unit comprising ball bearings of larger internal diameter than the external diameter of a shaft extending through the inner bearing rings, said ball bearings being so disposed that their inner rings exert radial forces on the shaft, the vector sum of which is substantially nought, the ball bearings being inclined with respect to the shaft axis and wherein the friction unit comprises at least two ball bearing jaws in a retaining member adapted to produce relative rotation between the shaft and the ball bearing jaws, each of which is provided with recesses for supporting the outer ring of at least one ball bearing, said recesses being so inclined that the axis of each ball bearing forms an angle with the plane defined by the shaft axis and the abutment of the inner ring of the said ball bearing against the shaft, the friction unit being further provided with clamping means adapted to clamp the ball bearing jaws more tightly against the shaft in response to an increase of the axial load on the shaft.

2. A device as defined in claim 1, and wherein the clamping members are adapted to clamp the bearing jaws more tightly against each other in response to a relative axial displacement of the jaws caused by an increased axial load on the shaft, each jaw having further spaces in which the ball bearings supported in the other jaw or jaws are freely movable.

3. A device as defined in claim 2, and wherein said clamping members are rigid guide means engaging the jaws in a manner by which a relative axial displacement of the jaws will impart pivoted movement to the guide means.

4. A device as defined in claim 3, and wherein said guide means consist in at least one ring which encloses the jaws and is provided with opposed cams directed and pressing against the outer surface of the jaws.

5. A device as defined in claim 4, characterized in that the said cams are tempered steel balls.

6. A device as defined in claim 2, characterized in that the clamping means are elastic members connecting the jaws.

7. A device as defined in claim 6, characterized in that the elastic means are at least one filament or wire wound around the jaws.

8. A device as defined in claim 7 and comprising two ball bearing jaws arranged substantially symmetrically one on each side of a first axial plane of the shaft, the retaining member comprising two end stops, one arranged to arrest the axial movement of one jaw when the shaft moves in one direction and the other arranged to arrest the axial movement of the other jaw when the shaft moves in the opposite direction.

9. A device as defined in claim 8, and wherein the two end stops are staggered to the same side of a second axial plane perpendicularly disposed to the said first axial plane.

10. A device as defined in claim 1, characterized in that one of the jaws is retained against movement in the axial direction of the shaft.

11. A device as defined in claim 2 and comprising two jaws, each jaw being guided by a carrier member each end of which is slidably supported in the retaining member in a manner which prevents pivotal movement, and each carrier member having at least at one end guide faces cooperating with guiding surfaces of the jaw and comprising two faces which are inclined with respect to the axial direction of the shaft, one forming an angle to one side of the said axial direction, the other an angle to the other side of the axial direction, the carrier members of the two jaws being disposed opposite each other and pressure springs being provided between the retaining member and the said one end of each jaw.

12. A device as defined in claim 11, and wherein each of the said springs rests on an abutment in the retaining member, this abutment being adjustable in the axial direction of the shaft.

13. A device as defined in claim 11, and wherein said guide faces comprise two parts forming different sized angles with the said axial direction and that the guide face part forming the larger angle is located outermost at the end of the carrier member where the said springs are provided.

14. A device as defined in claim 1, and wherein the clamping means are adapted to clamp the jaws more tightly against the shaft in response to an increase of the axial load thereof substantially without relative axial displacement of the jaws.

15. A device as defined in claim 14, and wherein the clamping means comprise a rigid ring enclosing the ball bearing jaws and adapted to exert pressure on the shaft in response to a common displacement of the jaws in the direction of load caused and determined by the axial load on the shaft.

16. A device as defined in claim 15 and having two ball bearing jaws disposed substantially symmetrically on either side of an axial plane of the shaft, the extent of said rigid ring in the axial direction of the shaft being a fraction of the length of the ball bearing jaws, the ring mounted with its axis coincident with the shaft axis when the device in unloaded and secured to each jaw by means of a pair of journals disposed diametrically in the ring and extending into holes flush therewith in the ball bearing jaws the parallel axes of the two pairs of journals extending closely adjacent to the said axial plane of the shaft at a predetermined distance, the retaining member having two abutments disposed so that the ring, irrespective of the direction of the axial load on the shaft, will tilt to the same side and thus urge the jaws against the shaft when it is loaded in axial direction.

17. A device as defined in claim 16, and wherein at least one of said abutments is adjustable in the axial directions of the shaft.

18. A device as defined in claim 15 and having two ball bearing jaws disposed substantially symmetrically on either side of an axial plane of the shaft, the extent of the ring and the ball bearing jaws in axial direction being substantially the same and that for each ball bearing jaw there is provided a pair of recesses which are symmetrical with respect to a plane through the shaft axis and perpendicular to the said axial plane of the shaft, one recess of a pair being provided in the inner surface of the ring and the other recess of the pair provided in the outer surface of the corresponding ball bearing jaw, the bottom of at least one of a pair of recesses forming an angle different from nought with the shaft axis for cooperation with the corresponding inclined face of a wedgeshaped carrier member, said carrier members being supported in a radial groove in the end walls of the retaining member so that the heavy ends of the two wedges face opposed walls of the retaining member.

19. A device as defined in claim 18, and wherein antifriction means are disposed between the cooperating surfaces of the recesses and the carrier member.

20. A device as defined in claim 19, and wherein the antifriction means are tempered steel rolls.

21. A device as defined in claim 18, and wherein the carrier members are adjustable in the axial directions of the shaft.

22. A device as defined in claim 15 and having two ball bearing jaws disposed one on each side of a first axial plane of the shaft, one of the jaws being rigidly connected to said rigid ring while the side of the other jaw facing away from the shaft has a recess extending parallel to the shaft and symmetrical with respect to a second axial plane through the shaft axis and perpendicular to the said first axial plane, the siad recess being aligned with a recess in the inner surface of the ring so as to form on either side of a carrier member extending through the recesses and supported in grooves in opposed walls of the retaining member two channels extending in the direction of the shaft, the width of at least one channel measured perpendicular to the shaft varying periodically in the direction of the shaft, and means attached to the ring for retaining the ball bearing jaws against axial displacement relatively to the ring.

23. A device as defined in claim 22, and wherein the width of one channel varies periodically and the width of the other channel is constant.

24. A device as defined in claim 22, and wherein at least one channel contains tempered steel rolls.

25. A device as defined in claim 14, having two ball bearing jaws retained against relative axial displacement, means being provided between one ball bearing jaw and a carrier member to prevent rotation but to permit axial displacement of the ball bearing jaw relatively to the carrier member, the ends of said carrier member being supported in radial grooves in opposed end walls of the retaining member, clamping means being further provided to clamp the jaws together in response to their axial displacement in relation to the carrier member.

26. A device as defined in claim 25, and wherein said means provided between one ball bearing jaw and the carrier member are tempered steel balls disposed in opposed axial grooves in respectively the ball bearing jaw and the carrier member.

27. A device as defined in claim 14, and wherein said clamping means are at least one elastic wire or filament wound around the carrier member and the second ball bearing jaw.

28. A device as defined in claim 1, and wherein the inner surface of the inner ring of each ball bearing in cross-section has a convexity facing the shaft such that the said surface contacts the surface of the shaft along a generating line for the shaft surface over substantially the entire width of the ball bearing.

29. A device as defined in claim 1, and wherein the inner surface of the inner ring of each ball bearing exhibits a plurality of elevations of substantially arched cross-section and disposed side by side.

30. A method of truing, polishing or calibrating a body of revolution, specifically a cylindrical shaft, said treatment being carried out by passing the body of revolution through a friction unit comprising at least two ball bearing jaws in a retaining member adapted to produce relative rotation between the shaft and the ball bearing jaws, each of which is provided with recesses for supporting the outer ring of at least one ball bearing, said recesses being so inclined that the axis of each ball bearing forms an angle with the plane defined by the shaft axis and the abutment of the inner ring of the said ball bearing against the shaft, the friction unit being further provided with clamping means adapted to clamp the ball bearing jaws more tightly against the shaft in response to an increase of the axial load on the shaft.

31. A method as defined in claim 30, and whereby a friction device is used in which the ball bearings are so inclined in the jaws that the respective inner rings move on the body of revolution along helical lines having the same pitch.

32. A method as defined in claim 31, and whereby a friction device is used in which at least one ball bearing is so mounted in the device that its inner ring, if it were operated alone, would move on the body of revolution along a helical line having a pitch different from that of at least one of the other ball bearings.

33. A method as defined in claim 30, and whereby a friction device is used in which the retaining member is held against movement.

* * * * *